United States Patent [19]
De Wit et al.

[11] Patent Number: 5,912,529
[45] Date of Patent: Jun. 15, 1999

[54] DISPLAY DEVICE COMPRISING A DISPLAY TUBE HAVING AN EXTERNAL SHIELD AGAINST THE EARTH'S MAGNETIC FIELD

[75] Inventors: Hendrik J. De Wit, deceased, late of Eindhoven; Henricus J. Kunnen, legal representative, Valkenswaard, both of Netherlands

[73] Assignee: U.S. Philips Corporation, New York, N.Y.

[21] Appl. No.: 08/826,915

[22] Filed: Apr. 9, 1997

[30] Foreign Application Priority Data

Apr. 9, 1996 [EP] European Pat. Off. .............. 96200970

[51] Int. Cl.$^6$ ..................................................... H01J 29/80
[52] U.S. Cl. ........................... 313/402; 313/407; 313/313
[58] Field of Search ..................................... 313/402, 407, 313/313, 479

[56] References Cited

U.S. PATENT DOCUMENTS

| 4,845,402 | 7/1989 | Smith ....................................... 313/422 |
| 5,382,868 | 1/1995 | Fukaishi ................................. 313/313 |

FOREIGN PATENT DOCUMENTS

0651422A1  5/1995  European Pat. Off. ......... H01J 29/86

*Primary Examiner*—Vip Patel
*Attorney, Agent, or Firm*—John C. Fox

[57] ABSTRACT

A display device comprising a display tube having a display screen with a pattern of phosphor elements. To reduce mislandings of electron beams, the display tube is accommodated within an external magnetic shield which is formed by one or more individual frames composed of bars of a magnetizable material and one or more excitable coils. The coils may be arranged, for example, alongside the frames.

7 Claims, 3 Drawing Sheets

DISPLAY DEVICE COMPRISING A DISPLAY TUBE HAVING AN EXTERNAL SHIELD AGAINST THE EARTH'S MAGNETIC FIELD

The invention relates to a display device which is provided with a display tube having an envelope comprising means for generating electrons, a transparent display window, a display screen with a pattern of phosphor elements on the inner surface of the window and means for directing electrons to the display screen, said display tube being provided with an external shield against the earth's magnetic field.

Such a display tube may be, for example, a color display tube of the type in which the display screen and means for generating electrons are arranged near opposing ends of the display tube and are interconnected by a funnel-shaped tube portion, a color-selection means (for example an apertured shadow-mask plate or a wire mask) and a magnetic shield being provided between the electron source and the screen.

The invention can be applied in all types of color and monochrome display tubes for television receivers or monitors. The invention is particularly useful for color display tubes because such tubes may be subject, not only to image deformation and changes in brightness as a result of the earth's magnetic field, but also to discoloration, which is generally regarded as being very disturbing. This will be explained hereinbelow.

The earth's magnetic field induces deflection of the electron paths in a display tube, which, without the appropriate measures, may even cause the electrons to impinge on a wrong phosphor element (mislanding) which leads to a locally deformed image and/or an image of the wrong color. In particular the component of the earth's magnetic field which extends in the axial direction of the display tube (the axial field) has a great influence. This may cause a lack of color or a color impurity in the corners of the display screen.

In accordance with a well-known measure, mislandings caused by the earth's magnetic field are reduced by using an internal magnetic shield which in combination with a shadow mask, which is also ferromagnetic, provides a partial shield against the earth's magnetic field. The shape of such a shield is approximately equal to the shape of the funnel-shaped part of the display tube.

To further reduce the influence of the earth's magnetic field, an external shield is provided, whether or not in combination with said internal shield. The external shield may be a metal sheeting which is provided around the tube, as described, for example, in U.S. Pat. No. 4,845,402. Another type of external shield is in the form of an open arrangement of bars of a soft-magnetic material, as described in EP-A-0 651 422 (=PHN 14.622 EP=U.S. Ser. No. 08/330,647). The cross-sections and the magnetic permeability of the bars are chosen to be such that they have a shielding effect.

In a possible embodiment of the latter solution, the bars form the ribs of a block. When the display tube is put into operation, it is important to demagnetize the arrangement of bars (preferably by means of an alternating field which decreases with time) so that the high anhysteric permeability can be used. To this end, use can be made of a demagnetization coil which can be connected to an exciting circuit. The larger the volume defined by the arrangement, the larger the amount of magnetic flux of the display tube that can be captured.

It is an object of the invention to provide such an embodiment of a shielded display tube that the adverse effect of the earth's magnetic field on the image (for example on the color purity thereof) is reduced without the necessity of an external sheeting or an undivided, enclosing arrangement of bars.

This object is achieved by providing a device of the type mentioned in the opening paragraph with an external shield which comprises a number of individual (i.e. not connected to each other) frames of a magnetizable material, which are provided around the display tube and which can at least partly compensate for the earth's magnetic field in two directions, and which further comprises at least an excitable coil to compensate for the component of the earth's magnetic field in the third direction. If the coil compensates for the axial component of the earth's magnetic field, the frames are preferably so arranged that their plane extends at right angles to the axis of the display tube. If the coil is used to compensate for the earth's magnetic field in another direction, then the frames are preferably arranged substantially in the plane at right angles to the above-mentioned direction. An embodiment is characterized in that the frames are "closed", i.e. they are composed of bars whose end portions are connected to each other. This has the advantage that they shield more effectively, can be provided more easily and can be used as supports for the coils. In particular, use is made of 2 frames because 2 frames are easy to install and their shielding properties are satisfactory. Another embodiment is characterized in that the frames are different in size. This has the advantage that a frame which is arranged at the level of the electron source can be reduced in size, so that it takes up less space and, thus, also the housing of the tube can be reduced in size. The frames may be trough-shaped in section, so that they can accommodate a coil. In another embodiment, use can be made of solid frames, with the coil being arranged alongside. Very good shielding properties are achieved by means of an embodiment in which the solid frame portions are arranged obliquely, for example at an angle in the range between 30 and 60 degrees, preferably 45 degrees, with respect to the plane at right angles to the axis of the display tube, with the coils being provided so that they are in contact with said frame portions. An embodiment in which the frames are made of iron has the advantage that the material costs are low, while degaussing with the coils, that are in contact with the frame portions and which serve to compensate for the earth's magnetic field, results in good magnetic shielding properties. The invention will have most effect in color display tubes as, apart from deformation and changes in brightness, also discoloration of the image may occur in such tubes. The invention can also suitably be applied to wide display windows having an aspect ratio above 4:3, especially 16:9, because in such display windows more deviations may occur in the corners of the screen.

These and other aspects of the invention will be apparent from and elucidated with reference to the embodiments described hereinafter.

In the drawings:

FIG. 1 is a sectional view of a color display tube having an internal shield;

FIG. 2 schematically shows the origin of mislanding;

Figure 1:
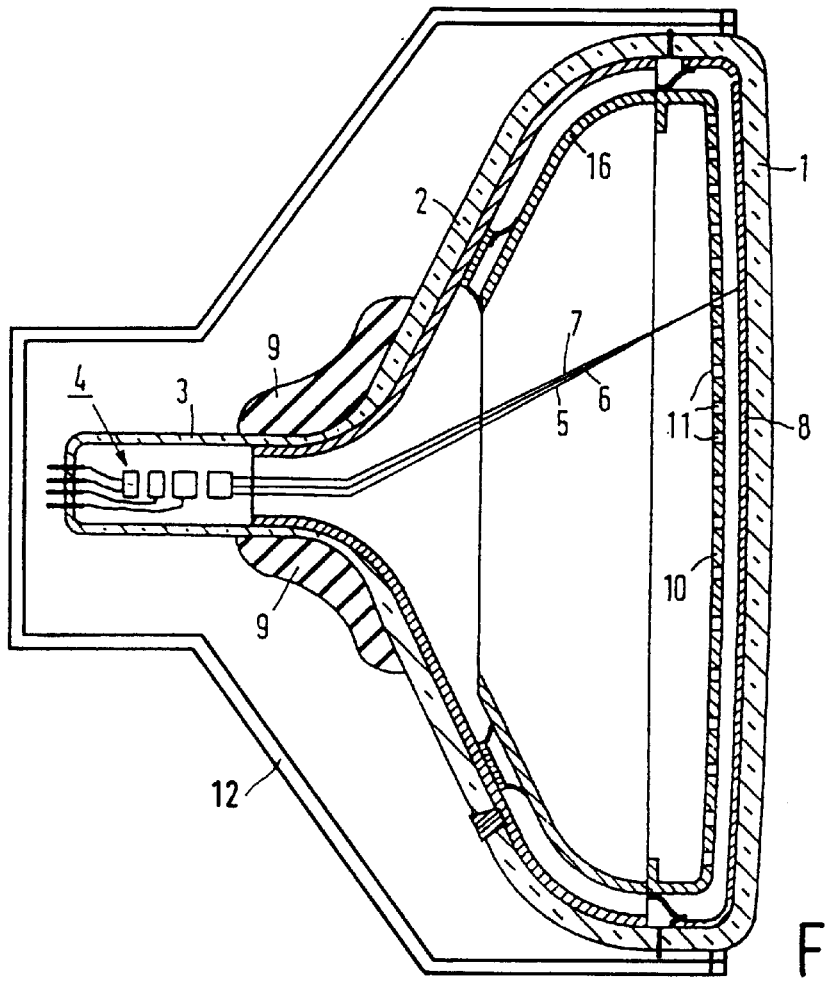
Figure 2:
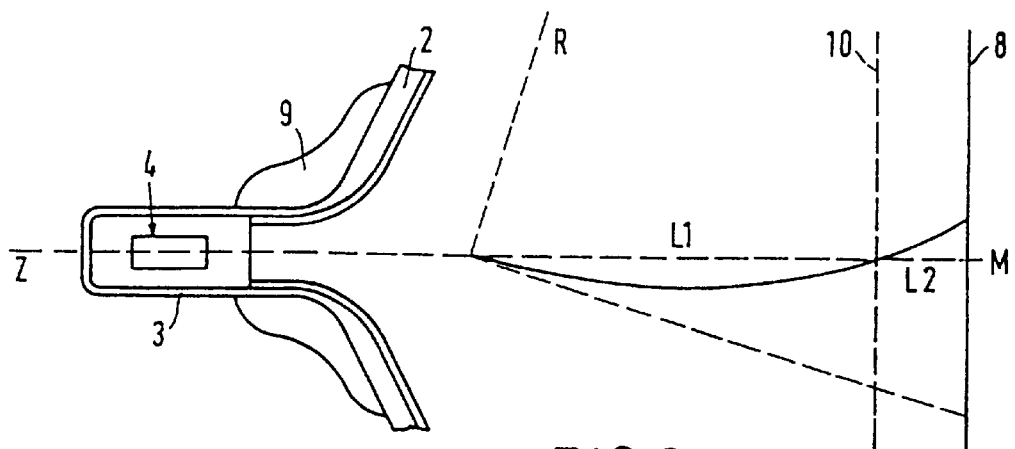

FIG. 1 is a horizontal, sectional view of a display tube which comprises a glass envelope consisting of a display window (1), a funnel (2) and a neck (3). In said neck (3) there is provided an electrode system (4) having three electron guns for generating three electron beams (5, 6, 7). The beams are directed to the display screen (8) which comprises a large number of luminescent phosphor elements. On their way to the display screen (8), the electron beams (5, 6, 7) are deflected across the display screen (8) by means of a deflection-coil system (9) which is coaxially arranged around the tube axis, which electron beams pass through a color-selection electrode, or shadow mask (10), which in this case is a metal plate having apertures (11). The three beams (5, 6, 7) pass through the apertures (11) at a small angle with each other and, consequently, each beam is incident on a phosphor element of a different color. A funnel-shaped magnetic shield (13) is arranged within the glass envelope, which itself is accommodated in a cabinet (12).

Depending on the conditions in which the phosphors are provided, the location of the phosphors is optimal for a tube orientation and a position on earth orientation (with the associated local earth's magnetic field) or for a field-free space. In another situation, an electron is incident on another spot of the shadow mask. This leads to deviations in the image, which are disturbing, in particular, in color display tubes. The angle at which the electron reaches the mask is different too. The electron impinges on the wrong phosphor element (mislanding) on the screen, the degree of mislanding can sometimes be such that the electron is incident on a phosphor element of a wrong color, which leads to color errors. Any electrons incident between two adjacent apertures in the mask are lost. This adversely affects the brightness of the image.

Figure 3:
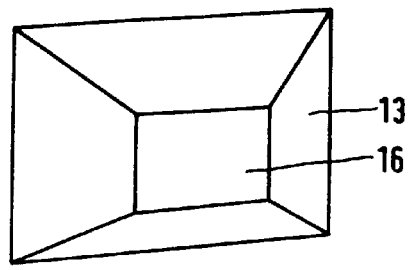
FIG. 3 is a perspective view of an embodiment of an internal shield.

The internal shield (13), an embodiment of which is shown in FIG. 3, partially compensates for the influence of the earth's magnetic field. Since the direction of the disturbing magnetic field is governed by the orientation and location of the tube, the internal shield must be demagnetized with a decreasing alternating field every time that the tube is put into operation, so that the magnetization of said shield can adapt itself to a possibly different situation. The shield must necessarily have an open end (16) at the gun side, so that total shielding cannot be provided.

Figure 4:
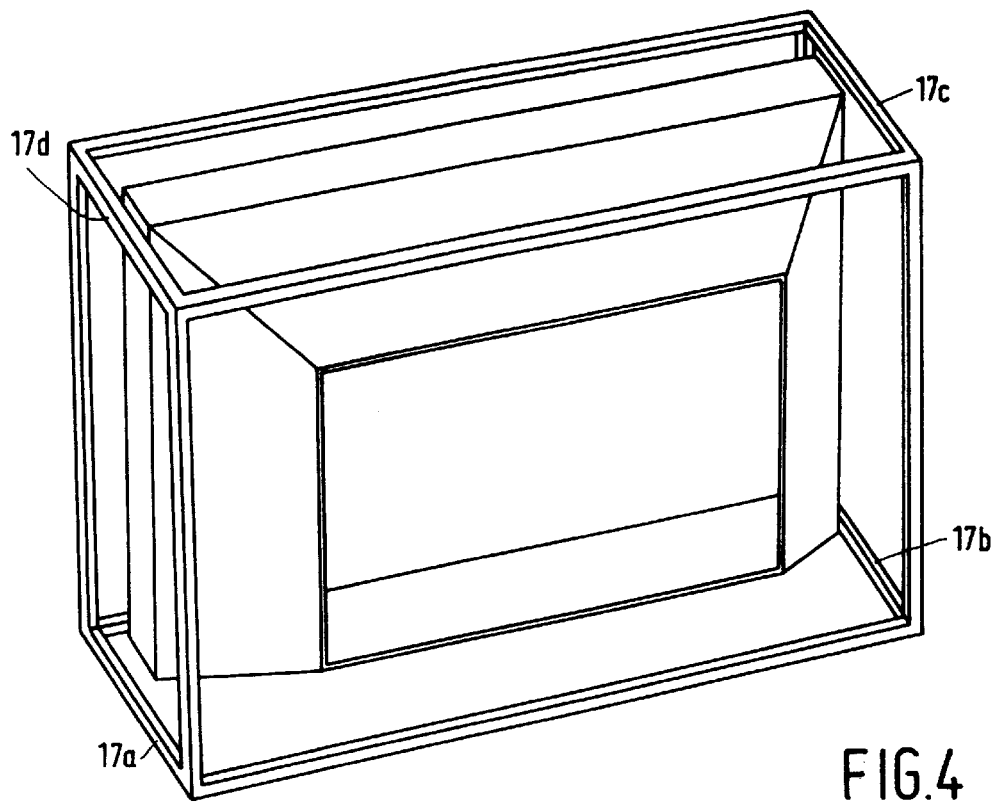
FIG. 4 is a perspective view of a known embodiment of an external shield of soft-magnetic bars, which are arranged in the form of an aquarium and which extend substantially transversely to each other, in combination with an internal shield.
Figure 5:
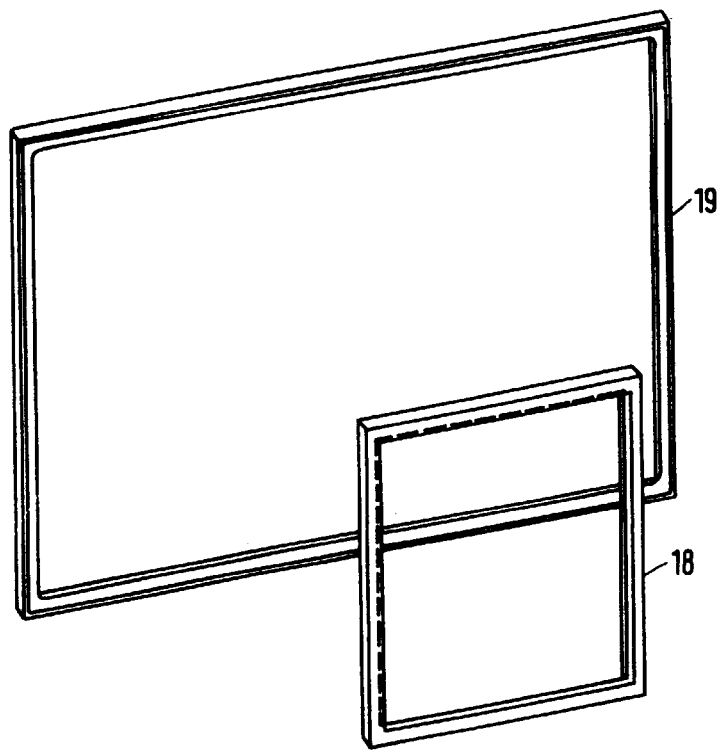
FIG. 5 is a perspective view of an embodiment of an external shield in accordance with the invention.

If use is made of an external shield of 12 interconnected soft-magnetic bars, which form the ribs of a block, an embodiment of which is shown in perspective in FIG. 4, the number of mislandings can be reduced by approximately 50%. However, a disadvantage of this construction is that it is difficult and expensive to install in a monitor.

Figure 6:
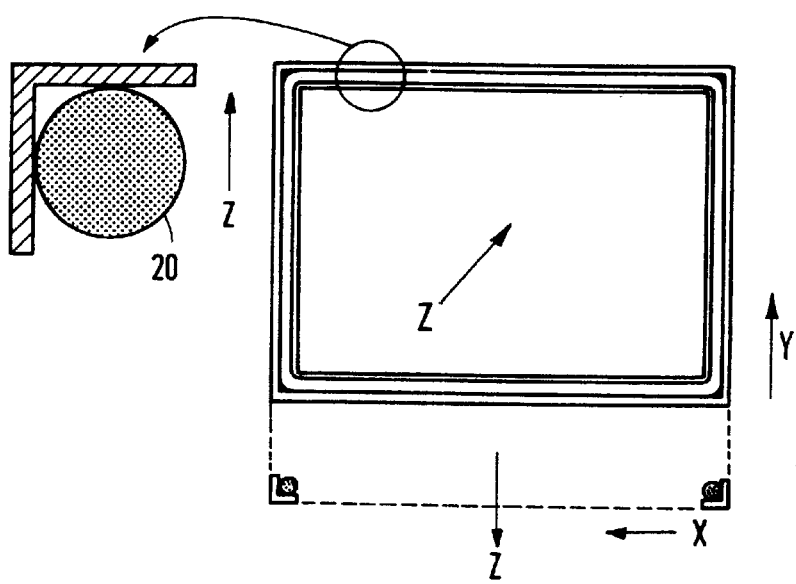
FIG. 6 is a sectional view of an embodiment of frames which are trough-shaped in section.
Figure 7:
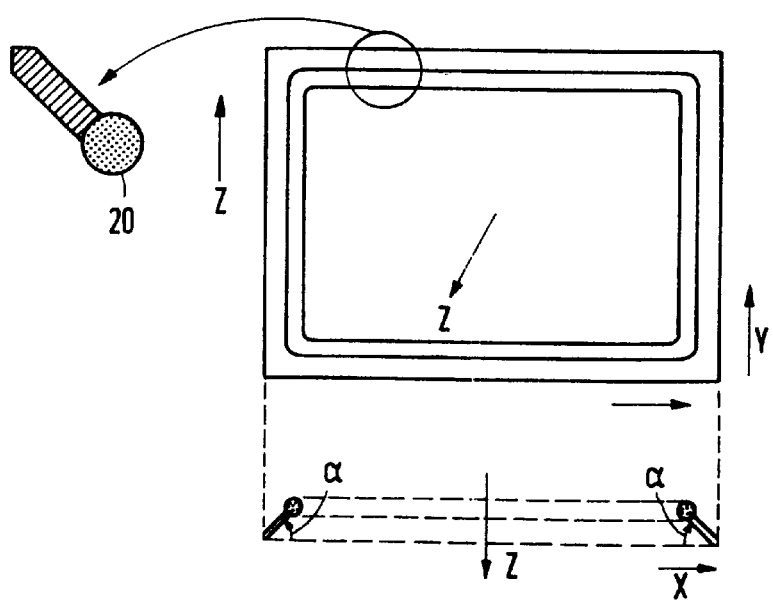
FIG. 7 is a sectional view of an embodiment of the frames, said frames being solid and so arranged that they make an angle of 45 degrees with the plane at right angles to the axis of the display tube.

The invention is based on the surprising discovery that two or more individual frames in combination with one or more coils to be excited yield at least the same result and are easier and cheaper to install than the above-described arrangement of bars. If the coils are situated alongside or inside the frames, the assembly can be installed even more easily and takes up less space. FIG. 6 shows how a coil is accommodated in a frame which is trough-shaped in section. FIG. 7 is a sectional view of a solid frame with a coil alongside. In this embodiment, the frame portions make an angle alpha with the plane at right angles to the axis of the display tube.

The metal of the frames serves as a conductor of a substantial part of the field lines of the lateral and the vertical earth's magnetic field. The current passing through the coils generates a field which can locally compensate for the entire axial earth's magnetic field. The current is controlled by a unit which receives information from a sensor about the field which has penetrated, so that said unit can determine the timing and magnitude of the adjustments.

The bars (17a, b, c and d) shown in FIG. 4, which extend from back to front, are replaced by one or more coils which may be situated alongside the closed frames arranged around the display tube. This results in a saving of space. In addition, the frame situated at the gun side (18) can be so constructed that it is smaller than the frame situated at the display-screen side (19), which also results in a saving of space and, moreover, enables a standard frame to be used for monitors of different dimensions.

Additional advantages are:
the metal of the frames enhances the operation of the coils, so that a weaker field is sufficient, which results in a saving of energy.
for the frames use can be made of ordinary iron instead of the commonly used, expensive silicon iron, because the coils can be used to degauss the iron so that the magnetic properties of said ordinary iron come near to the magnetic properties of soft-magnetic material.
the extensive metal construction on the outside of the monitor tube, which is provided as an electric shield, may be partly replaced by the frames.

In summary, the invention relates to:
a display device comprising a display tube having a display screen with a pattern of phosphor elements. To reduce mislandings of electron beams, the display tube is accommodated within an external magnetic shield which is formed by one or more individual frames composed of bars of a magnetizable material and one or more excitable coils. Said coils may be arranged, for example, alongside the frames.

It is claimed:

1. A display device which is provided with a display tube having an envelope comprising means for generating electrons (4), a transparent display window (1), a display screen (8) with a pattern of phosphor elements on the inner surface of the window and means (9) for directing electrons to the display screen (9), said display tube being provided with an external shield against the earth's magnetic field, characterized in that the external shield comprises a number of individual frames (18, 19) of a magnetizable material, which are provided around the display tube and which can at least partly compensate for the earth's magnetic field in two directions, and which further comprises at least an excitable coil (20) to compensate for the component of the earth's magnetic field in the third direction.

2. A display device as claimed in claim 1, characterized in that the frames are closed.

3. A display device as claimed in claim 1, characterized in that said display device comprises two frames.

4. A display device as claimed in claim 1, characterized in that the frames are different in size.

5. A display device as claimed in claim 1, characterized in that the display tube is a color display tube.

6. A display device as claimed in claim 1, characterized in that the aspect ratio of the display screen of the display tube is greater than 4:3.

7. A display device as claimed in claim 1, characterized in that the frames are made of iron.

* * * * *